Dec. 5, 1967    T. FLINTOFT    3,355,978
NAIL
Filed Oct. 7, 1965    2 Sheets-Sheet 2
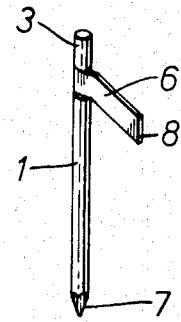
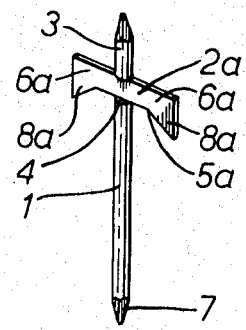
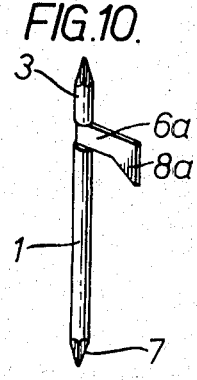
Inventor:-
Trevor Flintoft
Watson, Cole, Grindle + Watson
Attorneys

United States Patent Office 3,355,978
Patented Dec. 5, 1967

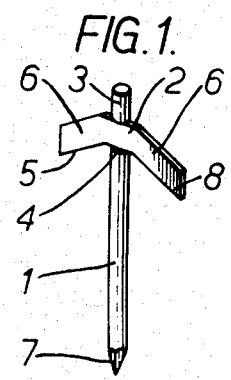
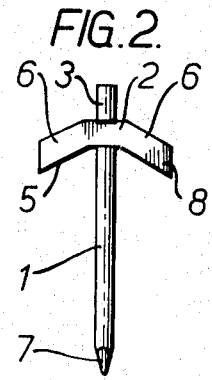
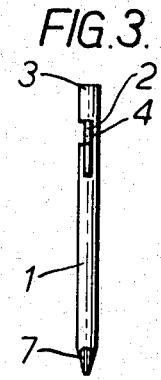
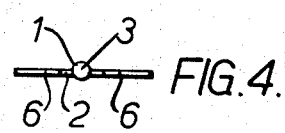
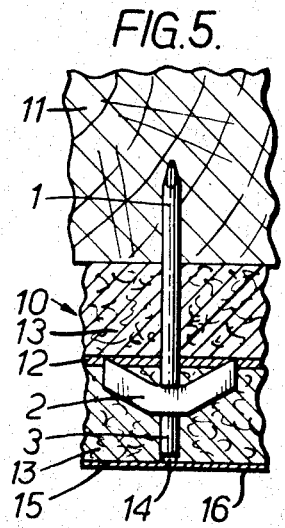
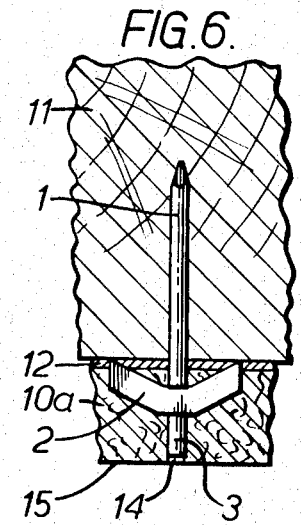
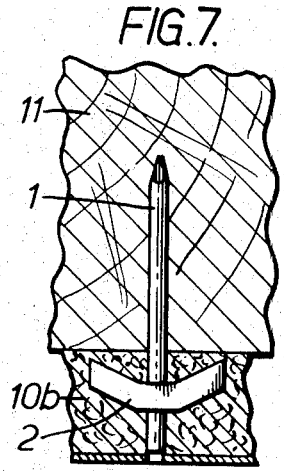

3,355,978
NAIL
Trevor Flintoft, Daventry, England, assignor to Lo-Dense Fixings (Rugby) Limited, Rugby, England, a British company
Filed Oct. 7, 1965, Ser. No. 493,759
4 Claims. (Cl. 85—29)

This invention has reference to nails and has for its object to provide an improved nail for obtaining effective securing in position soft sheet material such as expanded or foam plastic sheet material or plasterboard.

A particular object of the invention is to enable a nail to have a self-burying action in expanded polystyrene or like foam plastics sheet material yet at the same time firmly secure the sheet material in position.

In the accompanying drawings:

FIGURES 1 to 4 are respectively a perspective view, side elevation, end elevation and plan view of one form of nail embodying this invention.

FIGURES 5 and 6 are sectional elevations showing the nail of FIGURES 1 to 4 in use in securing reinforced plastic sheet material.

FIGURE 7 is a view similar to FIGURE 5 or 6 showing the nail securing unreinforced plastic sheet material.

FIGURES 8 to 10 are perspective views of alternative forms of the nail.

Like parts are referred to by the same or similar reference numerals throughout the drawings.

Referring to FIGURES 1 to 4 the nail shank 1 is provided flatwise with a crosspiece 2 spaced a distance from the head or driven end 3 of the shank, the crosspiece 2 being rigidly and permanently secured by welding or brazing in an open locating recess 4 in the shank 1.

As shown the crosspiece 2 is of thin blade or fin form lying substantially in an axial plane of the shank 1 such that the leading edge 5 of the crosspiece 2 cuts into expanded plastics sheet material or plasterboard for entry into the latter in a self-burying manner.

Thus in the nailing of expanded or foam polystyrene sheet 10, 10a or 10b to a ceiling joist 11 as shown in FIGURES 5 to 7 the crosspiece 2 and head end 3 of the nail fully enter the expanded plastic material so as to be self-burying in the latter in an inconspicuous or substantially invisible manner.

In FIGURE 5 the crosspiece 2 is shown positively engaging a reinforcement or barrier 12 sandwiched between two layers 13 of expanded plastic material of a sheet 10 composed thereof. In FIGURE 6 the crosspiece 2 is shown similarly engaging a reinforcement or barrier 12 provided as a backing to a single sheet 10a of expanded plastic material.

As shown in FIGURES 1 to 7 the leading or cutting edge 5 of the crosspiece 2 consists of two parts (i.e. of corresponding arms 6) mutually inclined e.g. in shallow inverted V-form or chevron form in relation to the leading end or point 7 of the shank 1 so that pointed end parts 8 of the crosspiece 2 are advanced in the general direction of the point 7.

Particularly by such an arrangement of blade and where used in sheeting of expanded plastic material such as polystyrene, the beads of the latter tend to "bunch up" in advance of the blade 2 i.e. between the latter and any reinforcement or barrier 12 of the sheet material 10 or 10a so that tenacious holding of the latter is obtained.

Practical tests have established that the abovementioned "bunching up" effect is such that satisfactory holding of the sheet material 10b by the nail can be obtained without the use of a reinforcement or barrier 12 as shown in FIGURE 7.

If desired the small hole 14 left in the exposed surface of the sheeting 10, 10a or 10b by the head end 3 of the nail can be filled with a suitable filler such as a paste made of polyvinyl acetate and powdered polystyrene or the like where the exposed facing of the sheeting is of the same or similar material. However where the exposed or underside face 15 of the sheet material is provided with a finishing such as a plaster skimming 16, such filling should not be necessary especially as the plastics material may tend to close over the nail head 3.

Referring to FIGURE 8 a modified form of crosspiece 2a is shown provided with pointed end parts 8a directed in the general direction of the nail point 7 so as to dig into any reinforcement or barrier 12 provided in the sheet material 10, 10a or 10b and also to obtain the "bunching up" effect of expanded plastics material at the leading edge 5a in the manner already described.

Instead of a crosspiece providing two arms 6 or 6a single arms or fins 6 or 6a may be provided as shown in FIGURES 9 and 10.

The crosspiece 2, 2a or arm 6, 6a are all spaced a distance from the head end 3 of the shank 1 as shown so as to obtain the desired burying action in the sheet material 10, 10a or 10b with a minimum of damage or marking to the exposed face of sheet material as the nail is hammered home.

I claim:

1. A nail comprising a shank having a pointed leading end and a rear head end and having an open recess in the side thereof a distance from said rear head end but nearer to the head end than to the pointed leading end; and a blade substantially thinner than the thickness of the shank and rigidly and permanently secured in said open recess and extending laterally from the shank in at least one direction, said blade lying flatwise against the shank substantially in an axial plane of the shank for self-burying edgewise cutting entry into soft material upon the shank being driven through said material.

2. A nail according to claim 1 wherein the blade is end-pointed in the direction of the pointed leading end of the shank.

3. A nail comprising a shank having a pointed leading end and a rear head end and having an open recess in the side thereof a distance from said rear head end but nearer to the head end than to the pointed leading end; and a cross piece blade substantially thinner than the thickness of the shank and rigidly and permanently secured in said open recess so as to be transverse to the shank and provide two arms extending laterally therefrom, said blade lying flatwise against the shank substantially in an axial plane of the shank for self-burying edgewise cutting entry into soft material upon the shank being driven through said material.

4. A nail according to claim 3 wherein the arms provided by the cross piece blade are mutually inclined in a direction toward the pointed leading end of the shank whereby pointed ends of the cross piece blade are advanced in the direction of the pointed leading end of the shank.

References Cited

UNITED STATES PATENTS

| | | | |
|---|---|---|---|
| 572,293 | 12/1896 | Greenfield | 85—9 |
| 612,407 | 10/1898 | Deakyne | 85—27 |
| 632,540 | 9/1899 | Sampson | 85—9 |
| 1,009,487 | 11/1911 | Dill | 85—49 |
| 1,227,722 | 5/1917 | Wills | 85—29 |
| 2,024,325 | 12/1935 | Allen | 85—28 |
| 2,338,754 | 1/1944 | Bonas | 85—28 |
| 2,672,832 | 3/1954 | Goetz | 85—10 |
| 2,770,194 | 11/1956 | Kopf et al. | 85—10 |
| 3,096,680 | 7/1963 | Dudgeon | 85—28 |

FOREIGN PATENTS

| | | |
|---|---|---|
| 487,740 | 11/1952 | Canada. |
| 327,217 | 3/1903 | France. |
| 387,611 | 1/1924 | Germany. |
| 64,979 | 6/1942 | Norway. |

CARL W. TOMLIN, *Primary Examiner.*

R. S. BRITT, *Assistant Examiner.*